(12) United States Patent
Markman et al.

(10) Patent No.: US 7,706,489 B2
(45) Date of Patent: Apr. 27, 2010

(54) SYMBOL TIMING AMBIGUITY CORRECTION

(75) Inventors: Ivonete Markman, Carmel, IN (US); Gabriel Alfred Edde, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 767 days.

(21) Appl. No.: 11/579,845

(22) PCT Filed: Mar. 29, 2005

(86) PCT No.: PCT/US2005/010518
§ 371 (c)(1),
(2), (4) Date: Nov. 8, 2006

(87) PCT Pub. No.: WO2005/114891
PCT Pub. Date: Dec. 1, 2005

(65) Prior Publication Data
US 2007/0229713 A1 Oct. 4, 2007

Related U.S. Application Data

(60) Provisional application No. 60/570,296, filed on May 12, 2004, provisional application No. 60/570,297, filed on May 12, 2004.

(51) Int. Cl.
*H04L 27/00* (2006.01)
(52) U.S. Cl. .................................................. 375/354

(58) Field of Classification Search ................. 375/354, 375/357, 369, 372, 373, 374; 370/395.62, 370/507; 455/265; 702/89; 713/375, 400; 348/726
See application file for complete search history.

(56) References Cited

U.S. PATENT DOCUMENTS

| | | |
|---|---|---|
| 5,604,541 A | 2/1997 | Kim et al. |
| 5,859,671 A | 1/1999 | Kim |
| 6,175,391 B1 | 1/2001 | Kwak |
| 2003/0194024 A1 | 10/2003 | Edde |
| 2006/0153296 A1* | 7/2006 | Deng .................... 375/240.12 |

FOREIGN PATENT DOCUMENTS

| | | | |
|---|---|---|---|
| EP | 0 772 332 A2 | 5/1997 |
| EP | 0 984 577 A2 | 3/2000 |

OTHER PUBLICATIONS

"Gude to the Use of the ATSC Digital Television Standard", Oct. 4, 1995, pp. 1-136, XP00296862.
European Search Report.
European Search Report, Jun. 23, 2005.

* cited by examiner

*Primary Examiner*—Sam K Ahn
(74) *Attorney, Agent, or Firm*—Robert D. Shedd; Joseph J. Opalach

(57) ABSTRACT

A centroid calculator calculates the channel virtual center for an adaptive equalizer, based on some type of training signal (e.g., the segment sync of a ATSC-DTV signal), with internal limiting capability that improves its performance. In addition, a centroid calculator with internal limiting capability that improves performance.

20 Claims, 10 Drawing Sheets

SYMBOL TIMING AMBIGUITY CORRECTION

This application is a National Stage Application and claims the benefit, under 35 U.S.C. 365 of International Application PCT/US2005/10518 filed Mar. 29, 2005, which was published in accordance with PCT Article 21(2) on Dec. 1, 2005 in English, and which claims the benefit of U.S. provisional patent application Nos. 60/570,296 and 60/570,297, which were both filed on May 12, 2004. This application is related to copending, commonly assigned, U.S. patent application Ser. Nos. 11/579,689 entitled CARRIER PHASE AMBIGUITY CORRECTION, filed on Nov. 6, 2006; and 11/596,339 entitled COMPLEX CORRELATOR FOR A VESTIGIAL SIDEBAND MODULATED SYSTEM, filed on Nov. 9, 2006.

BACKGROUND OF THE INVENTION

The present invention generally relates to communications systems and, more particularly, to a receiver.

In modern digital communication systems like the ATSC-DTV (Advanced Television Systems Committee-Digital Television) system (e.g., see, United States Advanced Television Systems Committee, "ATSC Digital Television Standard", Document A/53, Sep. 16, 1995 and "Guide to the Use of the ATSC Digital Television Standard", Document A/54, Oct. 4, 1995), advanced modulation, channel coding and equalization are usually applied. In the receiver, demodulators generally have carrier phase and/or symbol timing ambiguity. Equalizers are generally a DFE (Decision Feedback Equalizer) type or some variation of it and have a finite length. In severely distorted channels, it is important to know the virtual center of the channel impulse response to give the equalizer the best chance of successfully processing the signal and correcting for distortion. One approach is to use a centroid calculator that calculates the channel virtual center for an adaptive equalizer based on a segment synchronization (sync) signal. Another approach is to use a centroid calculator that calculates the channel virtual center for an adaptive equalizer based on a frame sync signal.

SUMMARY OF THE INVENTION

We have observed that the above-mentioned approaches for determining the channel virtual center do not address the impact of wrong symbol timing phase on the data that is provided as an input to the centroid calculator and consequently, on the centroid estimate. In other words, the above-mentioned approaches do not address the effect of demodulator symbol timing ambiguity in the centroid calculation and do not attempt to correct for this ambiguity.

Therefore, and in accordance with the principles of the invention, a receiver comprises a demodulator for providing a demodulated signal having multiple signal samples per symbol period and a centroid calculator responsive to the demodulated signal for selecting at least one of the multiple signal samples for use in determining the channel virtual center.

In an embodiment of the invention, an ATSC receiver comprises a demodulator, a centroid calculator and an adaptive equalizer. The demodulator demodulates a received ATSC-DTV signal and provides a demodulated signal having multiple samples per symbol period, T. The centroid calculator processes the demodulated ATSC-DTV signal and selects at least one of the multiple samples in each time period, T, for calculating the channel virtual center for the adaptive equalizer. Illustratively, the centroid calculator uses a training signal within the demodulated ATSC-DTV signal (e.g., either the segment sync or the frame sync) and selects the at least one sample to also correct for symbol timing ambiguity in the demodulator.

In accordance with the principles of the invention, a centroid calculator comprises an internal limiter, which improves performance.

DETAILED DESCRIPTION

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Likewise, other than the inventive concept, transmission concepts such as eight-level vestigial sideband (8-VSB), Quadrature Amplitude Modulation (QAM), and receiver components such as a radio-frequency (RF) front-end, or receiver section, such as a low noise block, tuners, demodulators, correlators, leak integrators and squarers is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 1:
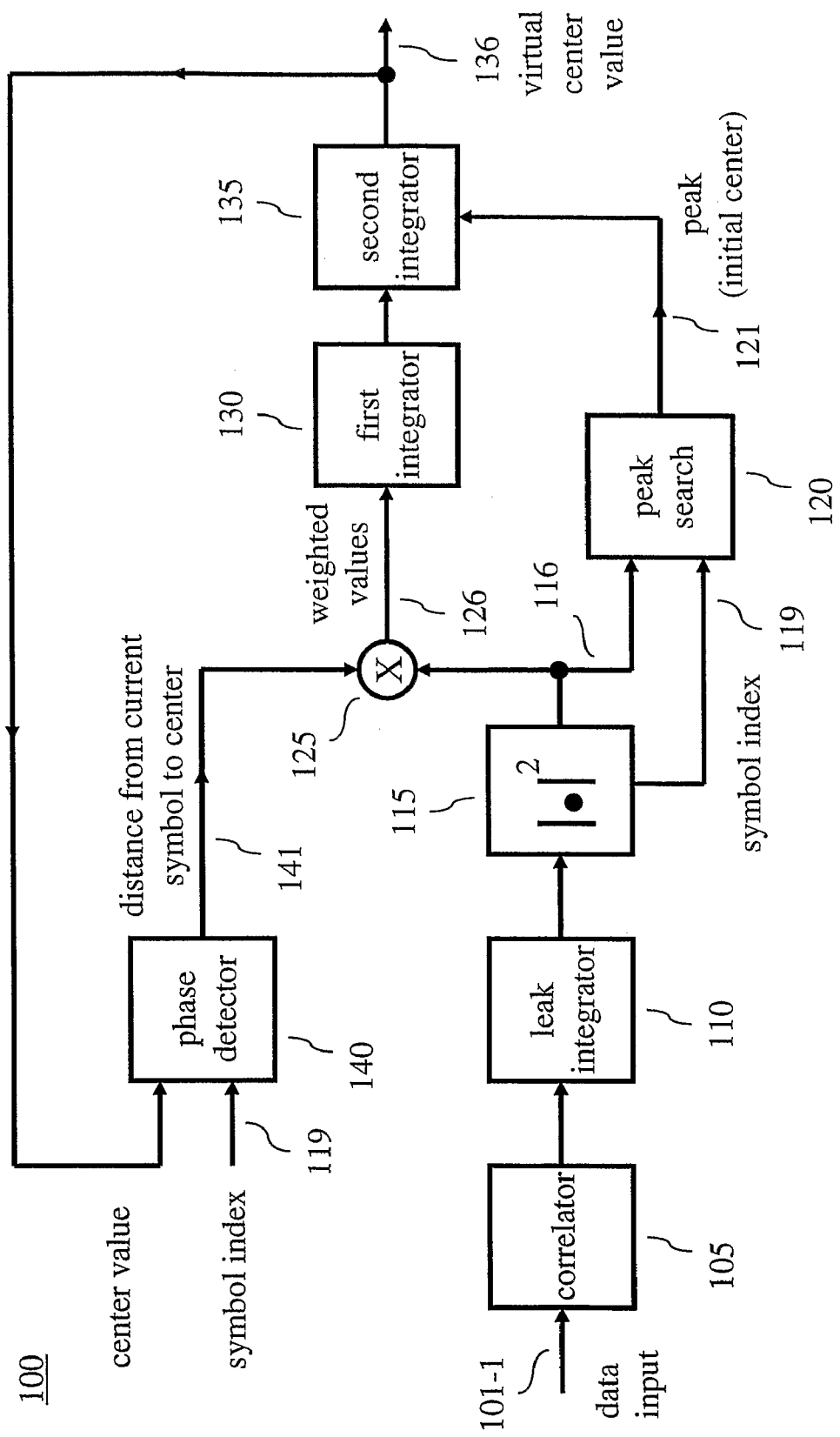
FIG. 1 shows a block diagram of a centroid calculator.

Before describing the inventive concept, a block diagram of a centroid calculator 100 is shown in FIG. 1 for use in an ATSC-DTV system. Centroid calculator 100 comprises correlator 105, leak integrator 110, squarer 115, peak search element 120, multiplier 125, first integrator 130, second integrator 135 and phase detector 140. Centroid calculator 100 is based on the segment sync signal, one sample-per-symbol and a data input signal 101-1 comprising only the in-phase (real) component. The data input signal 101-1 represents a demodulated received ATSC-DTV signal provided by a demodulator (not shown).

The data input signal 101-1 is applied to correlator 105 (or segment sync detector 105) for detection of the segment sync signal (or pattern) therein. The segment sync signal has a repetitive pattern and the distance between two adjacent segment sync signals is rather large (832 symbols). As such, the segment sync signal can be used to estimate the channel impulse response, which in turn is used to estimate the channel virtual center or centroid. Segment sync detector 105 correlates data input signal 101-1 against the characteristic of the ATSC-DTV segment sync, that is, [1 0 0 1] in binary representation, or [+5−5−5+5] in VSB symbol representation. The output signal from segment sync detector 105 is then applied to leak integrator 110. The latter has a length of 832 symbols, which equals the number of symbols in one segment. Since the VSB data is random, the integrator values at data symbol positions will be averaged towards zero. However, since the four segment sync symbols repeat every 832 symbols, the integrator value at a segment sync location will grow proportionally to the signal strength. If the channel impulse response presents multipath or ghosts, the segment sync symbols will appear at those multipath delay positions. As a result, the integrator values at the multipath delay positions will also grow proportionally to the ghost amplitude. The leak integrator is such that, after a peak search is performed, it subtracts a constant value every time the integrator adds a new number. This is done to avoid hardware overflow. The 832 leak integrator values are squared by squarer 115. The resultant output signal, or correlator signal 116, is sent to peak search element 120 and multiplier 125. (It should be noted that instead of squaring, element 115 may provide the absolute value of its input signal.)

As each leak integrator value (correlator signal 116) is applied to peak search element 120, the corresponding symbol index value (symbol index 119) is also applied to peak search element 120. The symbol index 119 is a virtual index that may be originally reset at zero and is incremented by one for every new leak integrator value, repeating a pattern from 0 to 831. Peak search element 120 performs a peak search over the 832 squared integrator values (correlator signal 116) and provides peak signal 121, which corresponds to the symbol index associated with the maximum value among the 832 squared integrator values. The peak signal 121 is used as the initial center of the channel and is applied to second integrator 135 (described below).

The leak integrator values (correlator signal 116) are also weighted by the relative distance from the current symbol index to the initial center and a weighted center position is then determined by a feedback loop, or centroid calculation loop. The centroid calculation loop comprises phase detector 140, multiplier 125, first integrator 130 and second integrator 135. This feedback loop starts after the peak search is performed and second integrator 135 is initialized with the initial center or peak value. Phase detector 140 calculates the distance (signal 141) between the current symbol index (symbol index 119) and the virtual center value 136. The weighted values 126 are calculated via multiplier 125 and are fed to first integrator 130, which accumulates the weighted values for every group of 832 symbols. As noted above, second integrator 135 is initially set to the peak value and then proceeds to accumulate the output of first integrator 130 to create the virtual center value, or centroid, 136. All integrators in FIG. 1 have implicit scaling factors.

Once the virtual center value 136 is determined, the VSB reference signals, such as the segment sync and the frame sync signal, are locally re-generated (not shown) in the receiver to line up at the virtual center. As a result, taps will grow in the equalizer to equalize the channel such that the equalized data output will be lined up at the virtual center.

Extensions of the system described above with respect to FIG. 1 to a complex data input signal (in-phase and quadrature components, two samples per symbol or to a frame sync based design are easily derived from FIG. 1.

Figure 2:
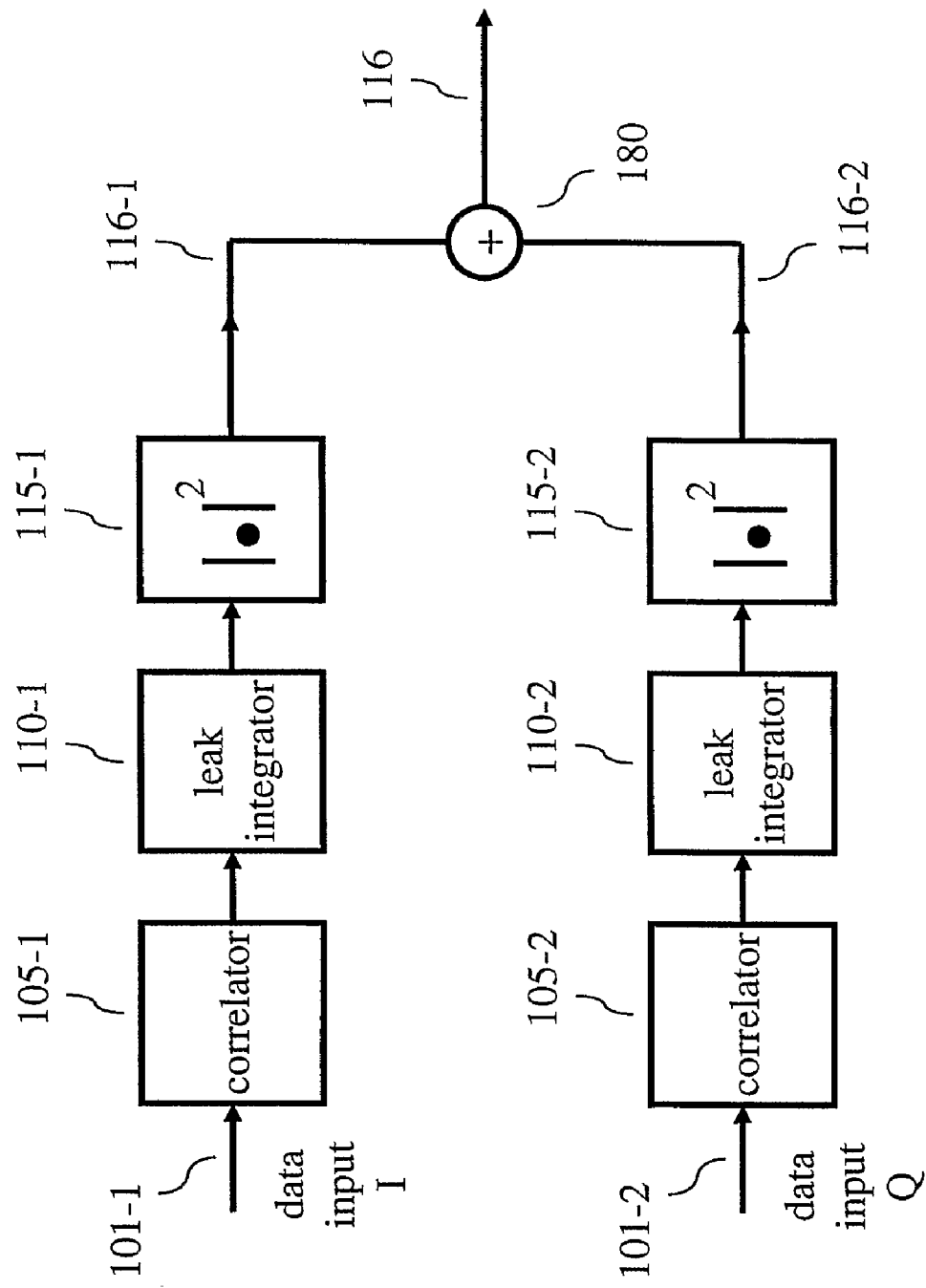
FIG. 2 shows a block diagram for processing a complex signal for use in a complex centroid calculator.

For example, if the data input signal is complex, the centroid calculator (now also referred to as a "complex centroid calculator") separately processes the in-phase (I) and quadrature (Q) components of the input data signal as shown in FIG. 2. In particular, the in-phase component (101-1) of the input data signal is processed via segment sync detector 105-1, leak integrator 110-1 and squarer 115-1; while the quadrature component (101-2) of the input data signal is processed via segment sync detector 105-2, leak integrator 110-2 and squarer 115-2. Each of these elements function in a similar fashion to those described above in FIG. 1. Although not shown in the figure, the symbol index can be generated from either squarer element. The output signals from each squarer (115-1 and 115-2) are added together via adder 180 to provide correlator signal 116 and the remainder of the processing is the same as described above with respect to FIG. 1.

With respect to a two-sample-per-symbol centroid calculator, T/2 spacing is illustratively used (where T corresponds to the symbol interval). For example, the segment sync detector has T/2 spaced values that match with a T/2 spaced segment sync characteristic, the leak integrators are 2×832 long and the symbol index follows the pattern 0, 0, 1, 1, 2, 2, ..., 831, 831, instead of 0, 1, 2, ..., 831.

Finally, for a centroid calculator based on the frame sync signal, the following should be noted. Since the frame/field sync signal is composed of 832 symbols and arrives every 313 segments this is longer than any practical multipath spread in a channel, hence, there is no problem in determining the position of any multipath signals. An asynchronous PN511 correlator may be used to measure the channel impulse response (if using the PN511 alone, out of the 832 frame sync symbols), as opposed to the segment sync detector in FIG. 1. (PN511 is a pseudo-random number sequence and described in the earlier-noted ATSC standard.) The additional processing is similar to that described above for FIG. 1 except that the processing is performed for the duration of at least one entire field. The correlation values are sent to the peak search function block to perform a peak search over one field time. The symbol index of this peak value is thus to be used as the initial virtual center point. Once the initial center point is determined, then the correlation results are analyzed only when a correlation output is above a pre-determined threshold and within a certain range before and after the initial virtual center point. For example, +/−500 symbols around the initial center position that the correlation output is above the pre-determined values. The exact range is determined by both the practical channel impulse response length that is expected to be encountered in a real environment and the length of the available equalizer. The remainder of the processing is the same as described earlier for FIG. 1.

We have observed that the above-mentioned approaches for determining the channel virtual center do not address the impact of wrong symbol timing phase on the data input to the centroid calculator and consequently, on the centroid estimate. In other words, the above-mentioned approaches do not address the effect of demodulator symbol timing ambiguity in the centroid calculation and do not attempt to correct for this ambiguity.

Therefore, and in accordance with the principles of the invention, a receiver comprises a demodulator for providing a demodulated signal having multiple signal samples per symbol and a centroid calculator responsive to the demodulated signal for selecting at least one of the multiple signal samples for use in determining the channel virtual center.

Figure 3:
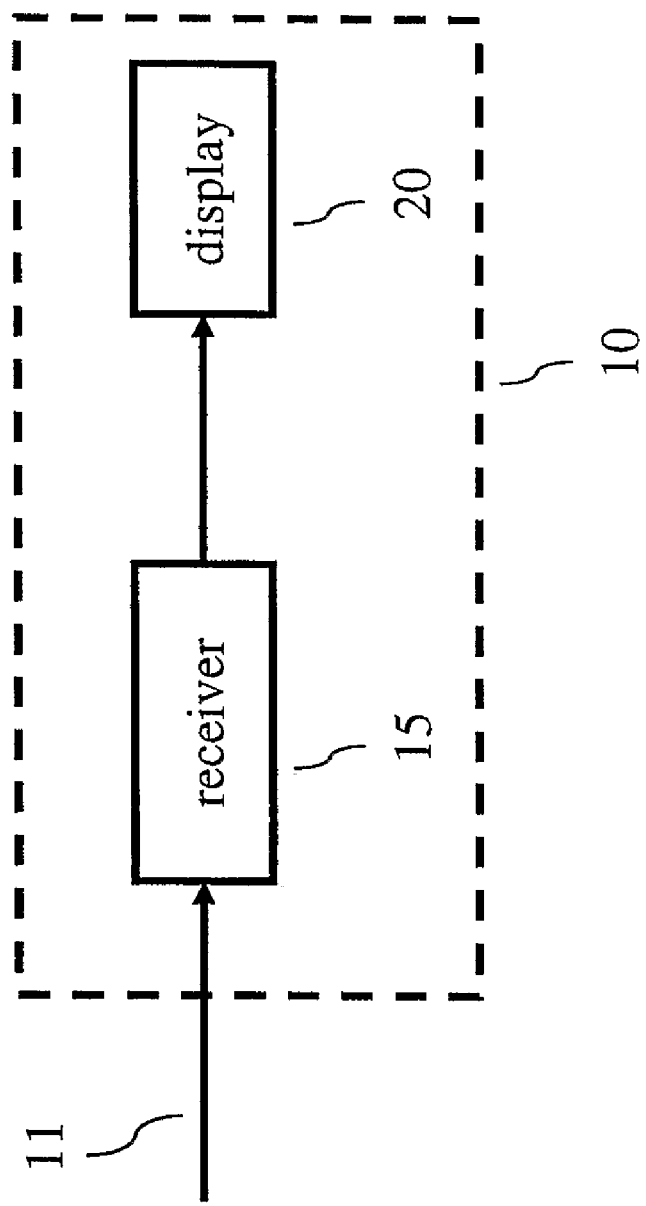
FIG. 3 shows an illustrative high-level block diagram of a receiver embodying the principles of the invention.

A high-level block diagram of an illustrative television set 10 in accordance with the principles of the invention is shown in FIG. 3. Television (TV) set 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that TV set 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon.

Figure 4:
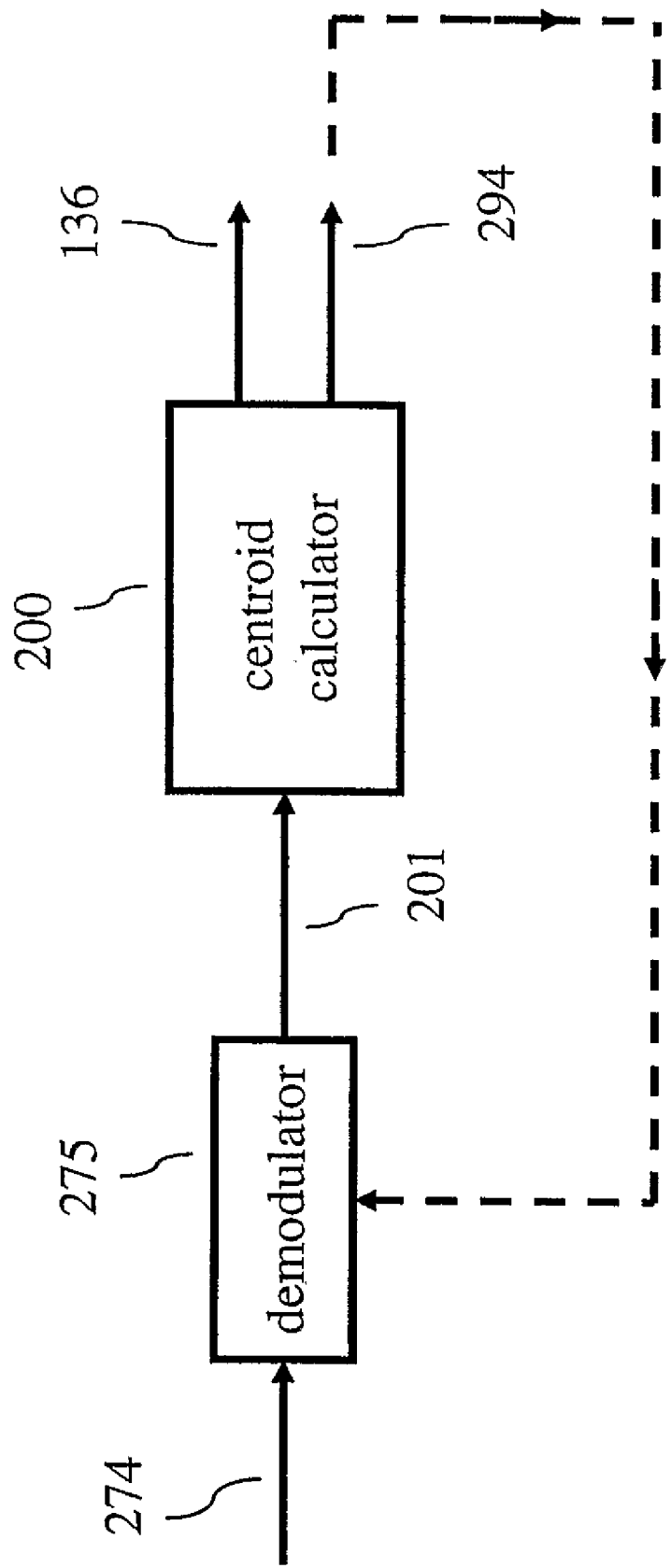
FIGS. 4-6 show illustrative portions of a receiver embodying the principles of the invention.

In addition, in accordance with the principles of the invention, receiver 15 includes a centroid calculator that corrects for symbol timing ambiguity. An illustrative block diagram of the relevant portion of receiver 15 is shown in FIG. 4. A demodulator 275 receives a signal 274 that is centered at an IF frequency ($F_{IF}$) and has a bandwidth equal to 6 MHz (millions of hertz). Demodulator 275 provides a demodulated received ATSC-DTV signal 201 having multiple samples per symbol period, T, to centroid calculator 200, which, and in accordance with the principles of the invention, selects at least one of the multiple samples in each time period, T, for calculating the virtual center value 136 for use by an adaptive equalizer (not shown). Illustratively, centroid calculator 200 may also provide symbol timing information via signal 294 to demodulator 275 to correct for symbol timing ambiguity in demodulator 275 (illustrated via the dashed line shown in FIG. 4). (It should be noted that other processing blocks of receiver 15 not relevant to the inventive concept are not shown herein, e.g., an RF front end for providing signal 274, etc.)

Figure 5:
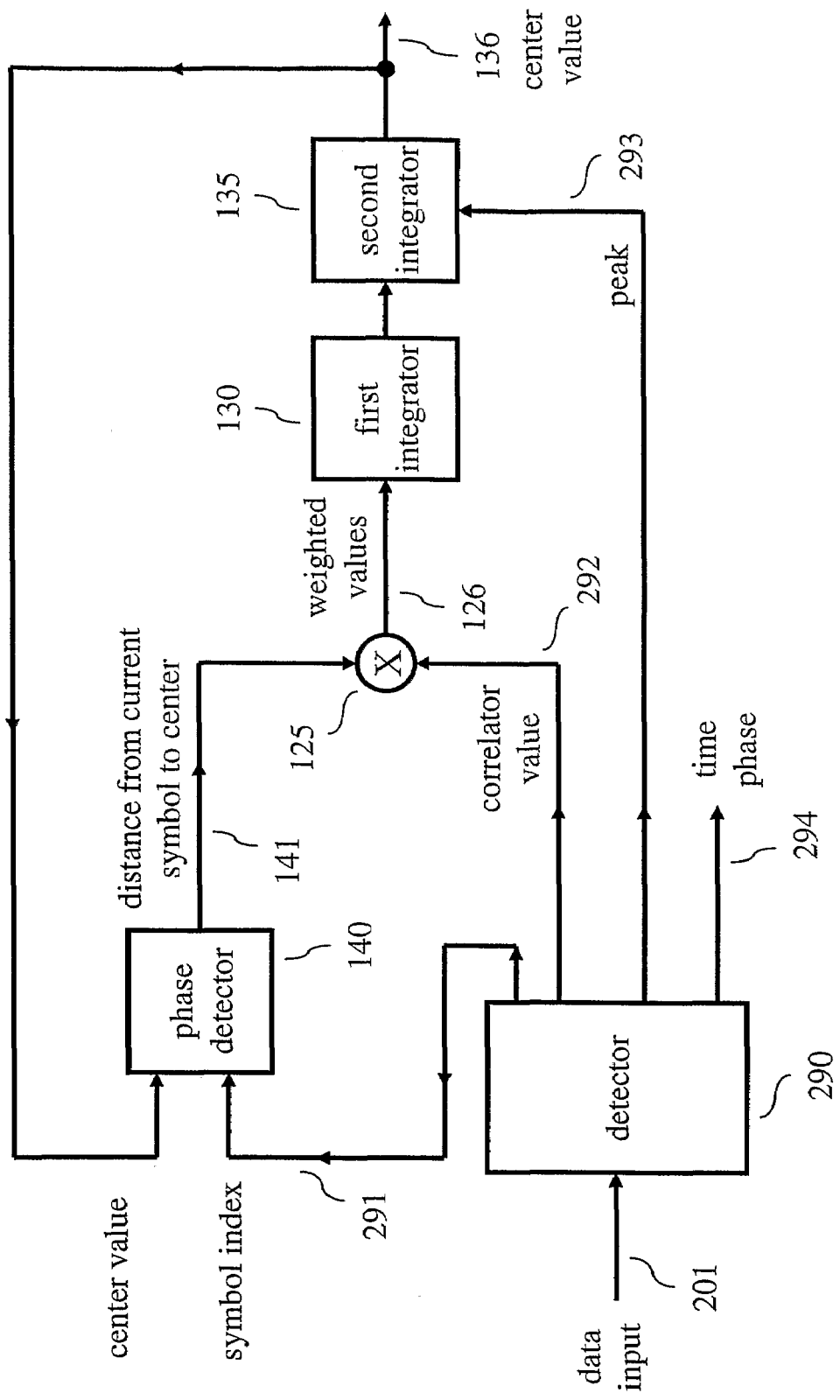

Referring now to FIG. 5, an illustrative block diagram of centroid calculator 200 is shown. Centroid calculator 200 comprises detector 290, phase detector 140, multiplier 125, first integrator 130 and second integrator 135. Except for detector 290, centroid calculator 200 is similar in operation to centroid calculator 100 (describer earlier). A data input signal 201, which represents the demodulated received ATSC-DTV signal provided by demodulator 275, is applied to detector 290. The latter enables centroid calculator 200 to take into account symbol timing ambiguity in determining the virtual center value 136 and, illustratively, provides symbol timing information via signal 294.

Figure 6:
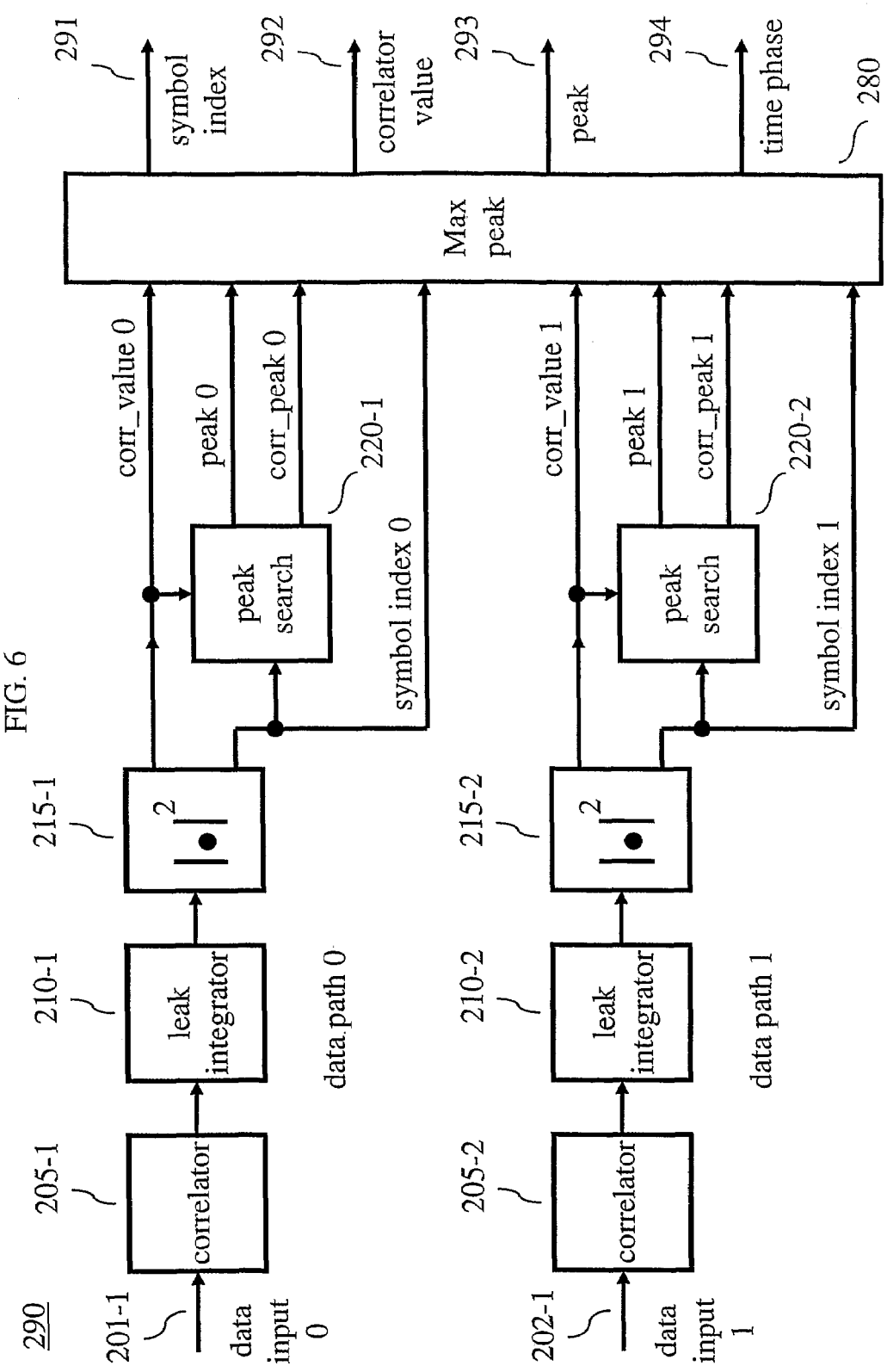

Turning now to FIG. 6, an illustrative block diagram of detector 290 in accordance with the principles of the invention is shown. In this example, detector 290 operates on two samples per symbol period, T, and uses the in-phase component of the data input signal 201. However, the inventive concept is not so limited. In FIG. 6, data input signal 201 comprises two samples: a first sample represented by data input 0 (201-1) and a second sample represented by data input 1 (202-1). In this regard, it is assumed that demodulator 275 of FIG. 4 is either a serial-output demodulator or a parallel-output demodulator. If demodulator 275 is a serial-output demodulator, then demodulator 275 provides data input 0 and data input 1 as a sequence of alternating samples associated with a demodulator clock (not shown). On the other hand, if demodulator 725 is a parallel-output demodulator, then demodulator 275 provides data input 0 and data input 1 as a pair of samples at the same time associated with the demodulator clock (not shown). In either case, the demodulator clock may have a frequency of twice the symbol rate (1/T) or higher. If the clock frequency is higher than twice the symbol rate, a sample enable (not shown) identifies when the samples are available with respect to the demodulator clock. For the sake of simplicity and without loss of generality, it is assumed in the following that the clock frequency is equal to the symbol rate (1/T) and that demodulator 275 is a parallel-output demodulator.

As can be observed from FIG. 6, each sample is processed in a similar fashion. In particular, data input 0 is processed by a correlator (segment sync detector) 205-1, leak integrator 210-1, squarer 215-1 and peak search element 220-1. Likewise, data input 1 is processed by a correlator (segment sync detector) 205-2, leak integrator 210-2, squarer 215-2 and peak search element 220-2. Output signals from these two processing paths are applied to max peak element 280, which provides a symbol index value 291, a correlator value 292, a peak value 293 and a time phase value 294. As described further below, these elements of detector 290 enable centroid calculator 200 to take into account symbol timing ambiguity in providing virtual center value 136.

While a particular processing path for a sample (e.g., segment sync detector, leak integrator and squarer) in FIG. 6 is similar to that shown in FIG. 1, there are some key differences in the arrangement shown in FIG. 6 that enable detector 290 to identify the most appropriate sample (either data input 0 or data input 1) to use. In terms of similarities, both data input 0 and data input 1 are independently processed by a segment sync detector, leak integrator and squaring function. These elements of FIG. 6 are the same as the corresponding elements shown in FIG. 1.

The outputs of both squaring functions (215-1 and 215-2) in FIG. 6, correlated values 0 and 1 (denoted as corr_value 0 and corr_value 1 in FIG. 6) are then sent to peak search elements 220-1 and 220-2, respectively. The peak search performed by these elements is similar to the one performed in FIG. 1, with one added feature: a correlated value ("corr_peak") associated with the respective peak is also provided as an output signal from the peak search elements along with the "peak" value. The "corr_peak" value is the maximum correlated value among the 832 values searched for the centroid calculator based on the segment sync signal and, as before, the "peak" value is the symbol index associated with the maximum correlated value. As such, peak search element 220-1 provides a "peak 0" output signal and "corr_peak 0" output signal. Similarly, peak search element 220-2 provides a "peak 1" output signal and "corr_peak 1" output signal In addition, squarers 215-1 and 215-2 provide respective symbol index values. In particular, squarer 215-1 provides a symbol index 0 value, which is a virtual index that may be originally reset at zero and is incremented by one for every new input data 0 sample; and squarer 215-2 provides a symbol index 1 value, which is a virtual index that may be originally reset at zero and is incremented by one for every new input data 1 sample. Both these indexes may be staggered in time (in the case of a serial-output demodulator) or may be identical (in the case of a parallel-output demodulator).

Once the peak search is performed by the respective peak search element, a set of values, or signals, for each sample is applied to max peak element 280, which decides which sample is the most appropriate one to use for calculating the virtual center value. In other words, max peak element 280 is a selection element for selecting the appropriate sample. The set of signals includes: the correlated value (corr_value) and symbol index value from each squarer; and the peak value and corr_peak value from each peak search element. As shown in FIG. 6, for data input 0, this set of signals includes the "corr_value 0", "peak 0", "corr_peak 0" and "symbol index 0"; while for data input 1, this set of signals includes the "corr_value 1", "peak 1", "corr_peak 1" and "symbol index 1".

Figure 7:
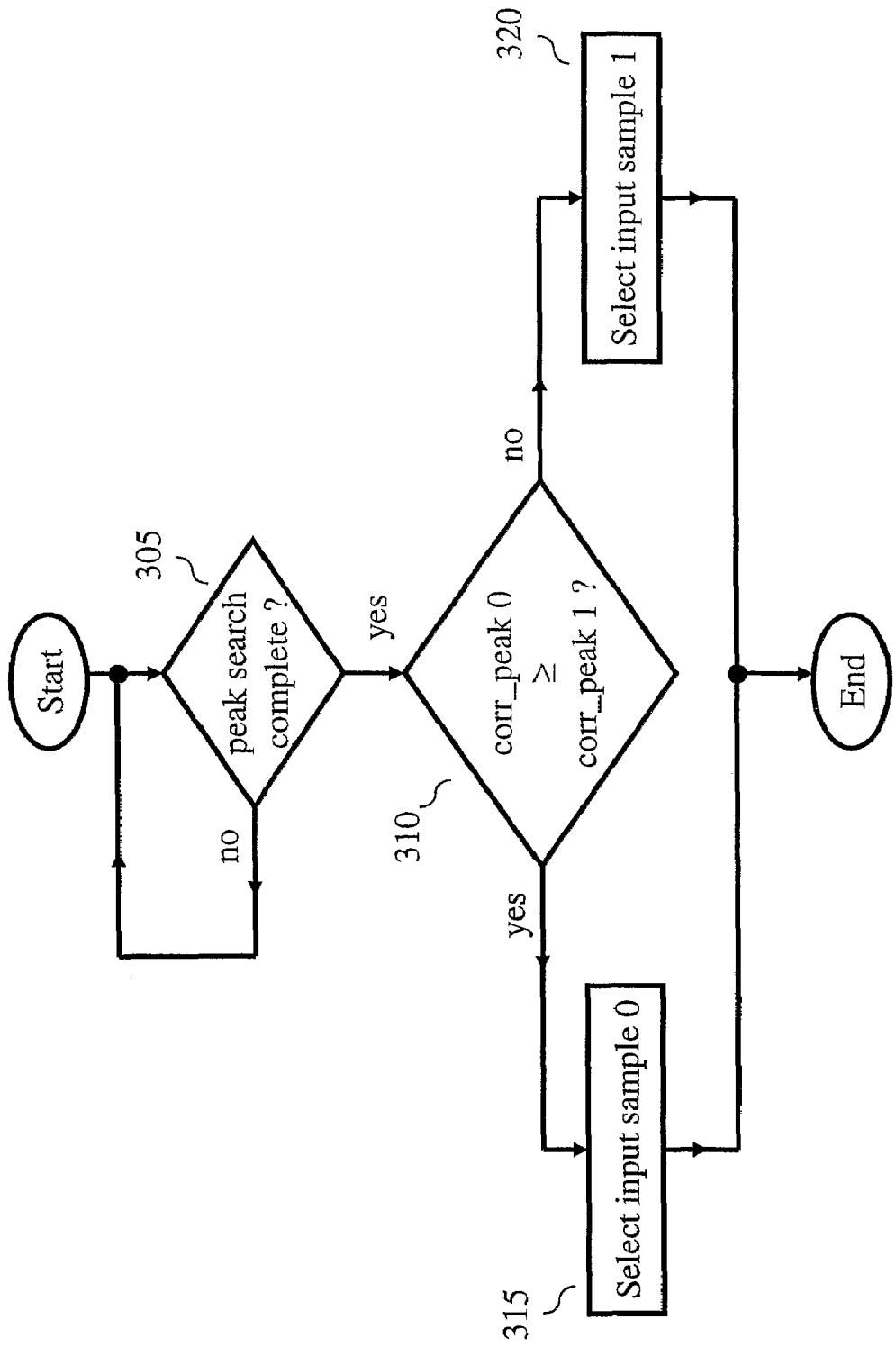
FIG. 7 shows an illustrative flow chart for use in a receiver in accordance with the principles of the invention.

The most appropriate or correct sample to use in determining the virtual center value is the one for which the corr_peak value is the largest. This comes from the observation that the correct sample phase yields the largest correlation over time. As such, max peak element 280 performs the flow chart shown in FIG. 7. In step 305, max peak element 280 waits for completion of the peak search for each sample. Once the peak searches are complete, max peak element 280 determines if the value of "corr_peak 0" is greater than, or equal to, the value of "corr_peak 1" in step 310.

If the value of "corr_peak 0" is greater than or equal to the value of "corr_peak 1", then max peak element 280 selects input sample 0 in step 315 and determines the values of the output signals 291, 292, 293 and 294 accordingly. In particular, max peak element 280 sets symbol index signal 291 to the value of symbol index 0 from squarer 215-1, sets correlator value 292 to the value of "corr_value 0" from squarer 215-1, sets peak value 293 to the value of "peak 0" from peak search element 220-1 and sets the value of time phase signal 294 equal to a value representative of the selection of input sample 0, e.g., a value of "0".

On the other hand, if the value of "corr_peak 0" is less than the value of "corr_peak 1", then max peak element 280 selects input sample 1 in step 320 and determines the values of the output signals 291, 292, 293 and 294 accordingly. In particular, max peak element 280 sets symbol index signal 291 to the value of symbol index 1 from squarer 215-2, sets correlator value 292 to the value of "corr_value 1" from squarer 215-2, sets peak value 293 to the value of "peak 1" from peak search element 220-2 and sets the value of time phase signal 294 equal to a value representative of the selection of input sample 1, e.g., a value of "1".

Once the correct timing sample is identified by max peak element 280, the output signals 291, 292 and 293 from max peak element 280 are then applied to the remainder of the elements of centroid calculator 200 as illustrated in FIG. 5 and the processing proceeds as described earlier for the centroid calculator shown in FIG. 1. As a result; the centroid calculation loop operates on the correct sample and is independent of demodulator symbol timing ambiguity. In addition, max peak element 280 provides time phase signal 294, which represents the selected timing sample. For example, time phase signal 294 is "0" when the correct sample is input data 0 and "1" when the correct sample is input data 1. By feeding this signal back to demodulator 275 (illustrated in FIG. 4), demodulator 275 can then adjust its symbol enable signal (not shown) to point to the correct sample and remove any timing ambiguity at its output. As such, the correct demodulator output sample can then be fed to any blocks following, or downstream from, the demodulator (e.g., an equalizer, trellis decoder, deinterleaver, etc.).

It is important to notice that although the apparatus that was first shown and described in FIG. 1 can have a two-sample-per-symbol centroid calculator, that calculator is not designed for the purpose of correcting symbol timing ambiguity in the demodulator in accordance with the principles of the invention. In particular, that calculator accumulates the two samples and does not distinguish one from the other. Also, in the context of FIG. 1, a two-sample-per-symbol correlator is used, and would be highly dependent on the data prior and after the segment sync. In contrast, in detector 290 of FIG. 6 the same one-sample-per-symbol correlator is used for both samples. In addition, no information is extracted from the centroid calculator of FIG. 1 for application to the demodulator for possible correction of timing ambiguity.

Other variations in accordance with the principles of the invention are possible. For example, the operation of max peak element 280 in steps 315 and 320 of FIG. 7 can be altered as follows. In particular, in step 315 max peak element 280 sets symbol index signal 291 to the value of symbol index 0 from squarer 215-1, sets correlator value 292 to the sum of the values of ("corr_value 0"+"corr_value 1"), sets peak value 293 to the value of "peak 0" from peak search element 220-2 and sets the value of time phase signal 294 equal to a value representative of the selection of input sample 0, e.g., a value of "0". And in step 320, max peak element 280 sets symbol index signal 291 to the value of symbol index 1 from squarer 215-2, sets correlator value 292 also to the sum of the values of ("corr_value 0"+"corr_value 1"), sets peak value 293 to the value of "peak 1" from peak search element 220-2 and sets the value of time phase signal 294 equal to a value representative of the selection of input sample 1, e.g., a value of "1".

In another embodiment in accordance with the principles of the invention, the centroid calculator shown in FIGS. 4, 5 and 6 is extended in-phase and quadrature data, that is, is a complex centroid calculator, as illustrated in FIG. 2. In particular, for the complex centroid calculator, the in-phase (I) and quadrature (Q) data are sent to separate correlators and their outputs go into two separate leak integrators. The two integrator outputs are squared and added together to create a respective "corr_value" signal for further processing as shown and described for FIGS. 5 and 6, above.

In another embodiment in accordance with the principles of the invention, the centroid calculator is extended to process N samples per symbol at a time, where N is an integer and N≧2, in-phase data input only (as shown in FIG. 6) or in-phase and quadrature data input (as described above). In this regard, max peak element 280 now decides among N data paths (data input 0 to data input N−1) instead of just between two data paths. As such, each sample has a corresponding data path and the processing of each data path is similar to that described above for FIGS. 4, 5, 6 and 7 (where the flow chart is appropriately extended to decide among N possibilities).

Figure 8:
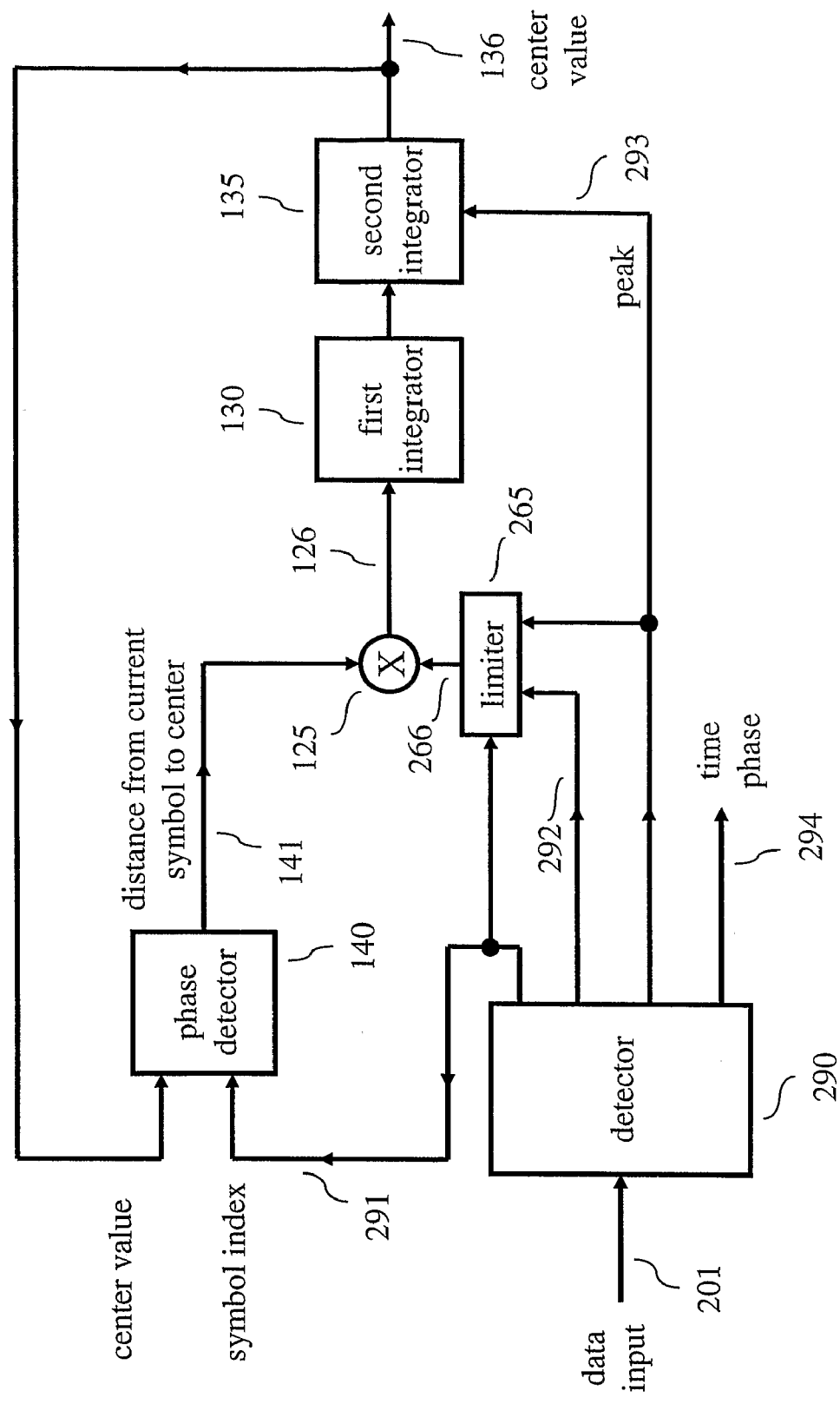
FIGS. 8-10 show other illustrative embodiments in accordance with the principles of the invention.
Figure 9:
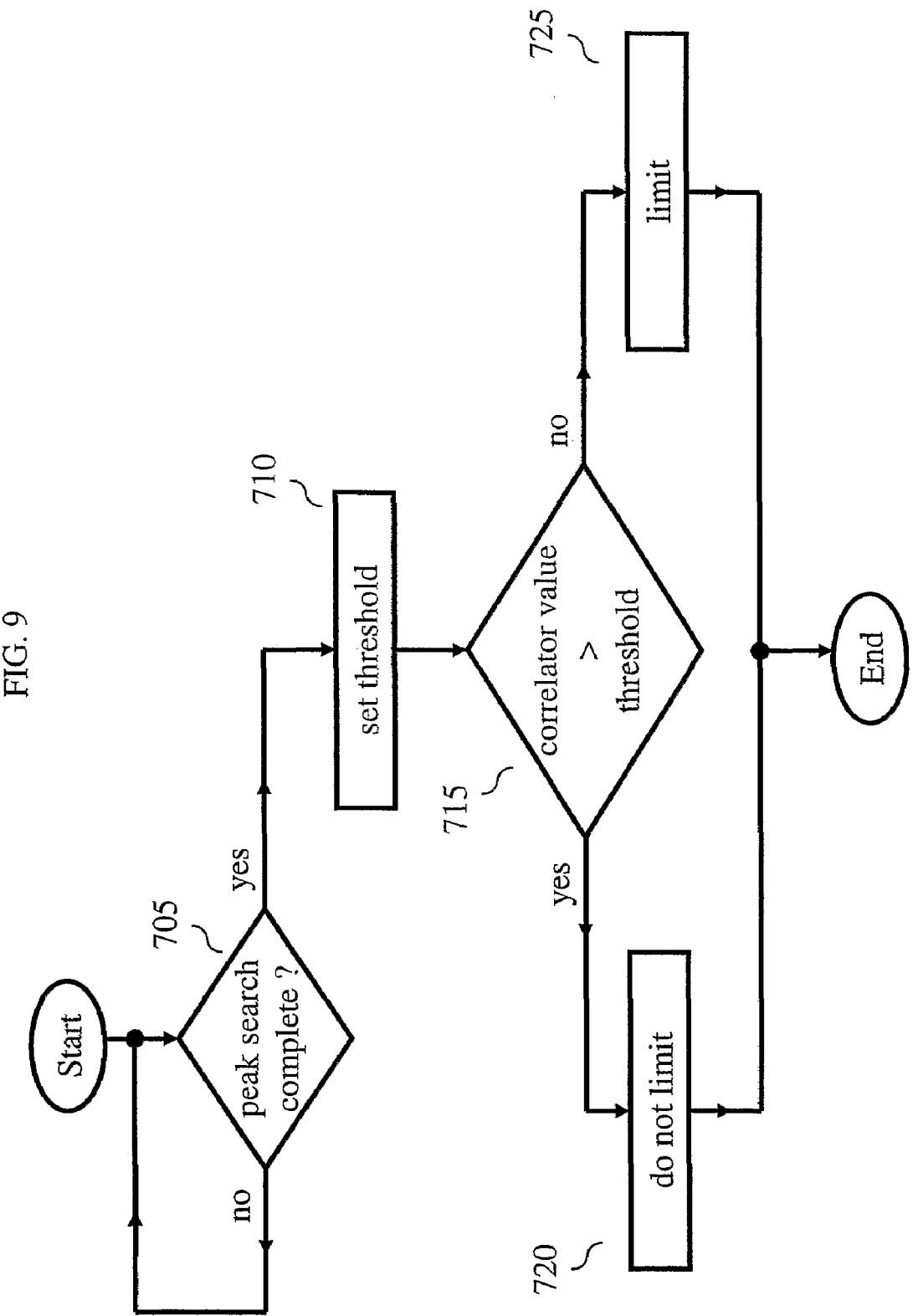

Turning now to FIG. 8, another illustrative embodiment is shown. This embodiment is similar to that shown in FIG. 5 except for the inclusion of limiter 265 prior to the weighting operation performed by multiplier 125. The operation of limiter 265 is shown in the illustrative flow chart of FIG. 9. In step 705, limiter 265 waits for completion of the peak search. Once the peak search is complete, limiter 265 sets a threshold value in step 710. Illustratively, the threshold value is set equal to the (peak/K), where the value of K is chosen experimentally. In step 715, limiter 265 determines if the correlator value (292) is greater than the set threshold value. If the correlator value (292) is greater than the set threshold value, then limiter 265 does not limit the correlator value (292) in step 720, i.e., the value of signal 266 is equal to the value of signal 292 in FIG. 8. However, if the correlator value (292) is less than, or equal to, the threshold value, then limiter 265 sets the value of signal 266 equal to an illustrative limiter value, L, in step 725. In this example, L is equal to zero. As a result, in step 725, signal 266 is set equal to zero.

The idea behind limiter 265 is due to the fact that the concept of correlation and the assumption that random data and noise accumulate to zero in integrators assumes large samples, approaching an unbounded sequence size. However, the centroid calculation and consequent integrations happen within a limited amount of time. In fact, since the time for a centroid calculation affects the overall time for a receiver to lock, it is of interest to minimize the centroid calculator time. Therefore, there is a residual noise in the integrators associated with the data input and actual input noise, which is also a function of the centroid calculator operating time. This residual noise is not likely to affect the peak search, except in channels with zero or near zero dB ghosts. But since the weighted values (signal 126 of FIG. 8) are a product of correlated values times the distance from the current symbol to the center, noise in positions far away from the peak value may contribute substantially to the final calculation. As such, by providing a limiter as described above, the residual noise in the correlator integrators can be eliminated, improving the weighted value estimate. This limiter is more efficient if the threshold is a function of the peak value, eliminating excessive limiting in mismatched operation due to possible demodulator carrier phase and symbol tilting ambiguities, or Automatic Gain Control (AGC) mismatch.

The disadvantage of the use of a limiter is that in theory, the centroid calculator will be limited to only include ghosts above a certain strength level, since small levels will be disregarded by the limiter 265. However, proper choice of the constant K in step 710 will define a balance between which correlated values are the result of residual noise and which values are actual ghosts. Any ghost strength levels that are below the residual noise levels would not be properly addressed by the centroid calculator either with or without a limiter. As an example, for $K=2^6$, the limiter disregards any ghosts that are approximately 18 dB below the main signal.

Figure 10:
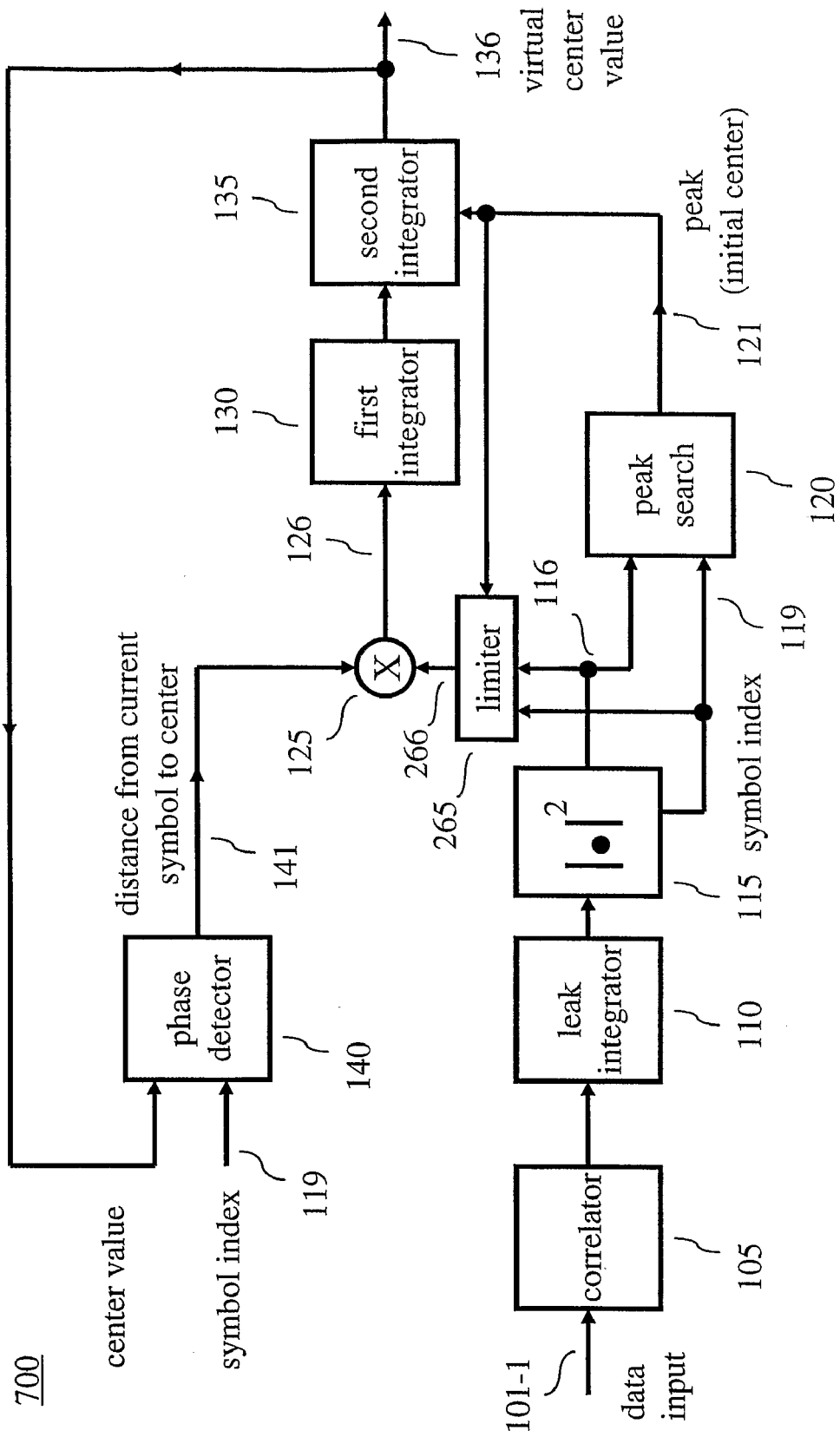

In accordance with the principles of the invention, the addition of a limiter to a centroid calculator applies to all of the embodiments described herein. For example, another illustrative embodiment 700 in accordance with the principles of the invention, is shown in FIG. 10. This figure is similar to the embodiment shown in FIG. 1, except for the addition of limiter 265. The latter functions as described above with respect to the flow chart of FIG. 9.

All the illustrative embodiments described herein in accordance with the principles of the invention can be based on any sync signal. The correlator compares the input data with the sync signal of choice. In the context of ATSC-DTV, some candidates are the segment sync signal or the frame sync signal. For these types of sync signals the difference is in the choice of the correlator and in the size of the integrators to accommodate the type and size of the sync signal.

Likewise, all of the illustrative embodiments described herein in accordance with the principles of the invention can be based on any type training signal of any digital communications system. In this case, the correlator compares the input data with the training signal in question. For all the embodiments described herein in accordance with the principles of the invention, the virtual center calculation certainly happens at the beginning of signal reception, but the process can continue on so that the optimum virtual center position is constantly updated based on the channel conditions and the virtual center can be shifted according to the updated virtual center position by slowly changing the sampling clock frequency accordingly. The same updates should then be made for the time phase output.

For all the embodiments described herein in accordance with the principles of the invention, once the weighted center, which is also the virtual center of the equalizer, is determined, the reference signals, such as the segment sync and the frame sync signal are locally re-generated in the receiver to line up at the virtual center. As a result, taps will grow in the equalizer to equalize the channel such that the equalized data output will be lined up at the virtual center.

For all the embodiments described herein in accordance with the principles of the invention, the blocks strictly associated with the generation of the output time phase may be implemented separately from the remainder of the centroid calculator and used for the purpose of correcting time phase ambiguity in the demodulator.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor, which executes associated software, e.g., corresponding to one or more of the steps shown in, e.g., FIG. 7 and/or FIG. 9. Further, although shown as elements bundled within TV set 10, the elements therein may be distributed in different units in any combination thereof. For example, receiver 15 of FIG. 3 may be a part of a device, or box, such as a set-top box that is physically separate from the device, or box, incorporating display 20, etc. Also, it should be noted that although described in the context of terrestrial broadcast, the principles of the invention are applicable to other types of communications systems, e.g., satellite, cable, etc. It is therefore to be understood that numerous modifications may be made to the illustrative embodiments and that other arrangements may be devised without departing from the spirit and scope of the present invention as defined by the appended claims.

The invention claimed is:

1. A receiver, comprising:
a demodulator for providing a demodulated signal having N signal samples, where N>1; and
a centroid calculator responsive to the demodulated signal for selecting K of the N signal samples to determine a channel virtual center, where K<N;
wherein the centroid calculator includes a limiter for limiting correlation values therein as a function of a threshold value.

2. The receiver of claim 1, wherein the N=2.

3. The receiver of claim 1, wherein the centroid calculator comprises:
a detector responsive to the demodulated signal for selecting at least one of the N signal samples for use in providing at least one output signal; and
a centroid calculation loop responsive to the at least one output signal for determining the channel virtual center.

4. The receiver of claim 3, wherein the at least one output signal comprises a symbol index value, a correlator value and a peak value associated with the selected signal sample.

5. The receiver of claim 3, wherein the detector provides a time phase value representative of the at least one selected signal sample for application to the demodulator, whereby the demodulator can resolve any demodulator timing ambiguity.

6. The receiver of claim 3, wherein the detector comprises:
a plurality of paths, one for each of the N signal samples, wherein each path comprises:
a correlator, a leak integrator and a peak search element for use in providing for that path a set of signals comprising an associated correlation value, peak value, correlation peak value and symbol index; and
a selection element responsive to the set of signals from each of the plurality of paths for selecting at least one of the N signal samples for use in determining the channel virtual center and for providing as the at least one output signal the associated correlation value, peak value and symbol index of the selected signal sample.

7. The receiver of claim 6, wherein the correlator correlates to an ATSC-DTV (Advanced Television Systems Committee-Digital Television) segment sync signal.

8. The receiver of claim 6, wherein the correlator correlates to an ATSC-DTV (Advanced Television Systems Committee-Digital Television) frame sync signal.

9. The receiver of claim 1, wherein each of the N signal samples are complex.

10. The receiver of claim 1, wherein the centroid calculator is a complex centroid calculator.

11. The receiver of claim 1, wherein the threshold value is a function of a peak correlation value.

12. A method for use in a receiver, the method comprising the steps of:

demodulating a received signal for providing a demodulated signal having N signal samples, where N>1; and selecting K of the N signal samples to determine a channel virtual center, where K<N;

wherein the selecting step comprises:

determining for each of the N signal samples a symbol index value, a correlator value, and a correlation peak value;

selecting at least one of the N signal samples for use in determining the channel virtual center by comparing the correlation peak values associated with each of the N signal samples; and determining the channel virtual center as a function of the associated correlation value, peak value and symbol index of the selected signal sample.

13. The method of claim 12, wherein the N=2.

14. The method of claim 12, wherein the correlator value represents a correlation to an ATSC-DTV (Advanced Television Systems Committee-Digital Television) segment sync signal.

15. The method of claim 12, wherein the correlator value represents a correlation to an ATSC-DTV (Advanced Television Systems Committee-Digital Television) frame sync signal.

16. The method of claim 12, wherein each of the N signal samples are complex.

17. The method of claim 12, wherein each of the N signal samples are complex.

18. The method of claim 12, further comprising the step of providing a time phase value representative of the at least one selected signal sample for application to a demodulator, whereby the demodulator can resolve any demodulator timing ambiguity.

19. The method of claim 12, wherein the determining step includes the step of:

limiting correlation values as a function of a threshold value.

20. The method of claim 19, wherein the threshold value is a function of a peak correlation value.

* * * * *